UNITED STATES PATENT OFFICE.

CHARLES F. DOANE, OF EUREKA, CALIFORNIA.

PROCESS OF MAKING EMMENTHAL OR SWISS CHEESE.

1,334,693.   Specification of Letters Patent.   Patented Mar. 23, 1920.

No Drawing.   Application filed May 23, 1919.  Serial No. 299,124.

*To all whom it may concern:*

Be it known that I, CHARLES F. DOANE, residing at Eureka, in the county of Humboldt and State of California, have invented certain new and useful Improvements in Processes of Making Emmenthal or Swiss Cheese; and I do hereby declare the following to be a full, clear, and exact description of the same.

At the present time the manufacture of Emmenthal cheese (made and marketed in the United States under the name of domestic Swiss) is a highly developed art requiring great skill, acquired through long experience, to secure average results. Practically all of the Swiss cheese makers in the United States are men who learned the art usually in Switzerland. The length of time required to learn the art, and the very hard hours of labor required to manufacture the product, under the usual method, has discouraged residents of the United States from learning the business.

The skill acquired in learning Swiss cheese making is largely in the ability to tell when the curd is ready to dip from the whey and in adjusting the cooking temperature. If the curd is dipped too soon, glaesler, or blind cheese, may result. If the time is too long and the curd becomes too dry, the rind will peel while the cheese is being handled in the press, and the cheese may crack badly in the curing room. Either of these conditions, resulting from too long or too short cooking, is very serious. A difference in time of a very few moments frequently results in failure.

It is doubtful if any one unfamiliar with cheese curds of any kind can acquire the requisite skill in less than two years, though an experienced maker of American, or cheddar, cheese may acquire the skill in one year. In Switzerland apprenticeships of a number of years are required. The inspector of Swiss cheese factories for the Wisconsin Dairy and Food Commission has advocated the establishment of a State Swiss cheese factory for instructional purposes. He urged that in case such a factory was established, at least three years' experience in a Swiss cheese factory be required for entrance to the instructional courses, on the ground that this length of time was required to master the primary knowledge of cheese making.

With the present knowledge and practice of Swiss cheese making, probably not more than ten per cent. of this type of cheese made in the United States would grade "fancy", or would be a satisfactory substitute for the imported cheese, which in turn is the best, from the standpoint of the American consumer, of the cheese made in Switzerland. It is not unusual in Wisconsin for a factory operated by an experienced and capable cheesemaker to fail to turn out a single fancy cheese in the course of a season, and it is extremely unusual for a factory to make as much as fifty per cent. of cheese of this grade in one season. Factories making an unusually large percentage of the best grade one year may not make as much as ten per cent. of the same grade the year following, though operated by the same man.

The objects mainly sought to be attained by the present invention are:

Firstly, to provide a process which will render unnecessary that high degree of skill and experience which has heretofore been necessary to produce cheese of "fancy" grade.

Secondly, to provide a process with which cheese of a much higher average quality can be produced than with processes heretofore practised.

Thirdly, to eliminate losses due to deterioration, cracking, swelling, etc., in the curing stages.

Fourthly, to provide a process in which the product is rendered more rubbery and elastic, the distribution of the eyes is made more uniform, and the eye formation is carried to a higher development without danger of cracking the rind.

Fifthly, to provide a process with which the uniformity and average flavors may be controlled and modified.

To the above ends, this invention consists in certain novel modifications or variations in the usual process in connection with certain additional steps or manipulation of the milk and curd, all as will be hereafter pointed out in such wise as to be readily understood by those skilled in the art of Swiss cheese making.

In its broader aspect, the process of the present invention involves a step of preliminary preparation of the milk by heat whereby the subsequent cooking time and temperature become factors which in practice can be determined by comparatively unskilled operatives, or reduced to a time and temperature basis applicable in substantially all conditions met with in commercial practice. In other words, a standard of temperature and of cooking time becomes practicable, with little or no danger of spoiling the batch, without the highly technical skill heretofore essential for practically successful results.

The following is an example of proven practice giving temperature and time which are preferred because of the excellence of the results, but which are subject to considerable variation with good results, in some instances desirable where different texture and flavor are desired.

The milk from any source, in which lactic acid development is not excessive, and having the requisite butter fat content, is raised in temperature to approximately 143° F., preferably in a known creamery apparatus, such as a continuous heater. If heated to a higher degree—say 155° F.—the indications are that immediate cooling is desirable, but at lower temperatures (and the indications are that temperatures as low as 135° F. may be employed) the temperature may be maintained for a considerable period without injury.

After being held for approximately thirty minutes, the milk should be cooled to a temperature desirable for bacterial culture inoculation, an effective temperature being below 90° F., or approximately 88° F., and at this time the milk may be pumped into the usual steam jacketed round bottom kettles.

The bacterial cultures and a salt or acid are preferably added either simultaneously or successively before the rennet, or other known casein-coagulating enzyms, to impart the capacity of forming a curd which is less sensitive to over cooking in the subsequent cooking stages. This is conveniently accomplished by addition of hydrochloric acid or salt (NaCl). Hydrochloric acid of commercial strength answers well, and about 110 c. c. are added to 1650 pounds of milk, for example, in each kettle. The acid is diluted with cold water—say two gallons—so as to prevent coagulation before it is thoroughly mixed with the batch of milk.

The bacterial cultures of two different organisms are then added. These cultures are characterized by the production of a high percentage of lactic acid at high temperatures, even up to the cooking temperatures subsequently employed, and by the production of the eyes and characteristic Swiss cheese flavors.

The first culture may be recognized as *Bulgaricus*, and it is added to the batch in the proportion of, say, two quarts of milk diluted with two gallons of cold water.

The existence and action of the other organism or organisms having the stated characteristics is recognized and proven, but at this time a specific identifying name is not recognized. It, or they, may be provided by adding 30 grams of ground Swiss cheese to 1500 c. c. of sterilized whey, and developing for a period of about 24 hours. This quantity is added to each batch.

The organisms last referred to have been isolated, developed in sterile media, and dried. The indications are that the dried product will enable the commercial operations to be carried on with an increased certainty of result, but the identification, isolation, development, etc., of these characteristic Swiss cheese bacteria or organisms constitutes no part of my invention and is not claimed herein.

After slightly warming the milk, say to bring it to a temperature of approximately 95° F., about 110 c. c. of rennet extract is added to each batch.

The milk is "set" for about thirty minutes; i. e., coagulation takes place, and then the curd is cut, the temperature at this time, owing to radiation losses, being a few degrees lower than 95° F., last above referred to, although this is of no moment. The cutting is done with the customary harp in both directions, and the cut curd is stirred for about five minutes with the scoop to bring up any large chunks and the latter are cut with the scoop. Following this, stirring with the harp is continuous until the particles are fairly small—say approximately the size of kernels of corn.

About twenty minutes after the first cutting, steam is applied and the curd is brought up to approximately 130° F. The period required to attain this temperature being about thirty minutes. During the heating, and continuing for, say, forty minutes after the said temperature has been reached, active stirring with a standard whip stirrer is continued, when the curd should be ready for dipping.

Contrary to prior practice, considerable variations in temperatures and time are permissible under all conditions in cooking under present process without injuriously affecting the product, and it may be noted that the time given is comparatively long and the temperature comparatively high, but the practical results have been excellent. Any conditions in the milk heretofore causing uncertainty in result unless the cooking temperature and the dipping time were performed exactly right, are overcome. It will, therefore, be seen that with the present process, certainty in results is assured under all conditions, and the operations may be reduced to a time and temperature basis within wide limits which can be followed readily by comparatively unskilled operators.

Subsequent steps in the process are briefly as follows:

The curd is dipped, or seined, with a linen cloth of open mesh, preferably by removing the entire mass of curd in one dip, and the curd is placed in a hoop and pressed to give form to the cheese. The formed curd is turned and cloth changed about four times at intervals of about one hour, and the pressing is continued for about twenty hours longer.

The now formed cheese is placed in a brine tank for, say, 48 hours, to form a hard rind, and is then placed in a cold room (56° F. to 60° F. or thereabout). After this it is placed in a warm room (68° F. to 72° F. or thereabout) where eyes are fully developed, and it is then returned to a cold room until flavor and texture are developed. The time period may be three or four months for all shelf or room handling, and during this period the cheese should be turned, washed and salted every other day.

While it may not yet be stated as a fully determined fact, it is believed the excellence of the product and the latitude permissible in the time and temperature ranges at the periods where heretofore the highest skilled operators could not be certain of the result, are due to the physical changes wrought in the milk in the initial step or steps of the process, but it is not desired that the claims should be limited, except where so specified, to the particular time and temperature stated, especially in those portions of the process which substantially conform to prior practice.

The term "rennet" is employed herein as representative of known enzyms which are casein coagulants adapted to be used in cheese manufacture.

"Cooking", as the term is used herein, is that part of the process in cheese making where the curd is given the desired firmness and the moisture or whey is expelled from the curd particles by the application of heat through an extended period of time.

What I claim is:

1. A process of making cheese of the Emmenthal or Swiss type which consists in preliminarily heating the milk to a temperature between 134° and 155° F., cooling the same, adding rennet thereto and forming a curd, and finally cooking the curd by the application of heat to give the desired firmness and expel the moisture or whey from the curd particles.

2. A process of making cheese of the Emmenthal or Swiss type, embodying the steps of preliminarily heating the milk to a temperature above that of the subsequent cooking temperature of the curd, and not in excess of approximately 155° F., the duration of the heating period being inversely in proportion to the temperature employed, cooling the milk, adding rennet thereto to form a curd, and finally cutting, stirring and cooking the curd.

3. A process of making cheese of the Emmenthal or Swiss type which consists in heating the milk to a temperature between 134° and 155° F., cooling the same, adding thereto an acid or salt having the property of restoring or increasing rennet action, also adding thereto bacterial cultures capable of producing a high percentage of lactic acid at high temperatures and operating to produce eyes and characteristic Swiss cheese flavor in the cheese; adding rennet; allowing the curd to set; cutting, stirring and cooking the curd; and finally withdrawing and forming the curd into cheese.

4. A process of making cheese which consists in heating the milk to approximately 143° F., cooling the same, adding thereto an acid or salt having the property of restoring or increasing rennet action and also adding thereto bacterial cultures capable of producing a high percentage of lactic acid at high temperatures and operating to produce eyes and characteristic Swiss cheese flavor in the cheese; adding rennet; allowing the curd to set; cutting the curd; stirring and cooking the curd at a temperature of approximately 130° F., and finally withdrawing and forming the curd into the cheese.

CHARLES F. DOANE.